July 9, 1940.  J. E. McGRANE  2,207,328

BRAKE AND CLUTCH ATTACHMENT

Filed Nov. 1, 1937

INVENTOR.
John E. McGrane
BY
Murray, Sachhoff, Zugelter & Paddack
ATTORNEYS

Patented July 9, 1940

2,207,328

UNITED STATES PATENT OFFICE 2,207,328

BRAKE AND CLUTCH ATTACHMENT

John E. McGrane, Cincinnati, Ohio, assignor of one-half to Elmer J. Boos, Cincinnati, Ohio Application November 1, 1937, Serial No. 172,232

8 Claims. (Cl. 192—13)

This invention relates to a brake and clutch lever attachment for motor vehicles, and particularly, to a novel and simplified means for actuating the braking system and disengaging the clutch of said vehicle simultaneously.

An object of the invention is to provide a means for operating a brake and clutch of a motor vehicle which also serves as a check for periodic adjustment of the braking system of said vehicle.

Another object of the invention is to provide a simple, economical and efficient attachment for accomplishing the aforementioned objectives, which may be conveniently mounted in operative position on all types of vehicles, labor and installation costs therefore being almost negligible.

Other objects will be apparent from the following specification and drawing in which.

Figure 1:
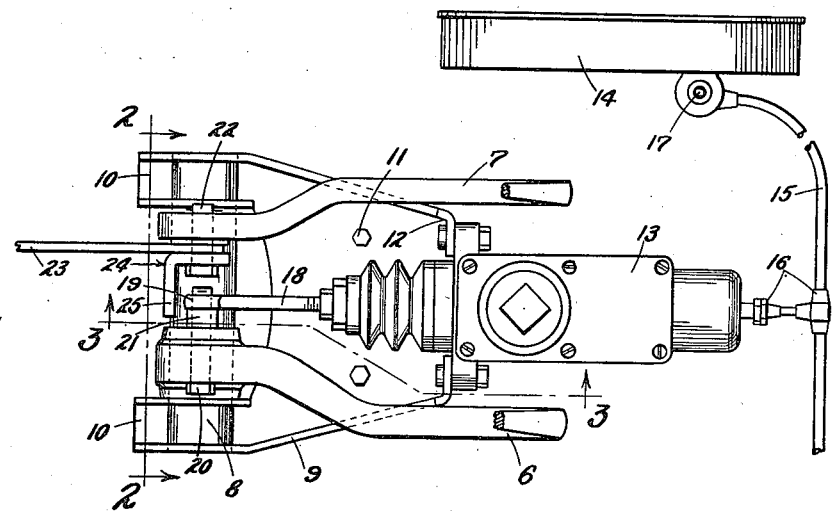
Fig. 1 is a plan view of the brake and clutch controls of a motor vehicle with my attachment in operative position thereon.
Figure 2:
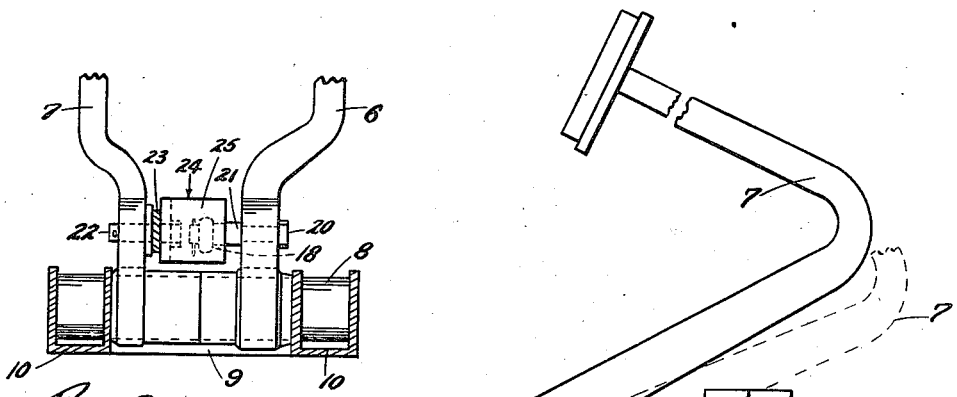
Fig. 2 is a cross-sectional view taken on line 2—2 of Fig. 1.

My invention comprises a brake lever 6 and a clutch lever 7 rockably mounted on a fulcrum pin 8. The fulcrum pin is positioned upon a plate 9 by providing a pair of upstanding flanges 10 on opposite sides of said plate which receive the end portions of said pin. The plate is positioned in conventional manner above and to the left side of the transmission housing of the motor vehicle, bolts 11 being adapted to fasten said plate to a part of the housing or cross-member of the chassis. The forward and inclined end 12 of the plate 9 has positioned centrally thereof a master cylinder 13 which is connected to the brake actuating members 14 by means of a pipe line 15 and suitable connections 16. This cylinder and its various connections may be the conventional hydraulic or fluid pressure brake system having valves 17 positioned upon the braking element of each wheel which functions as an adjustment for the system.

Disposed upon the rear wall of the cylinder 13 and mounted for reciprocating motion, in a substantially horizontal plane, is a piston or a brake actuating rod 18 which is provided with an eye portion 19 at its free end. The eye portion is adapted to receive a pin 20 which is rotatably held in the brake lever 6, a washer 21 being provided to retain the elements in spaced relationship. It will be seen that the operator of the motor vehicle may, by rocking the brake pedal 6 downwardly, actuate or move the brake rod 18 inwardly in a substantially horizontal plane and in a vertical plane parallel to the vertical plane the brake lever motion thus operating the brakes of the vehicle.

Figure 3:
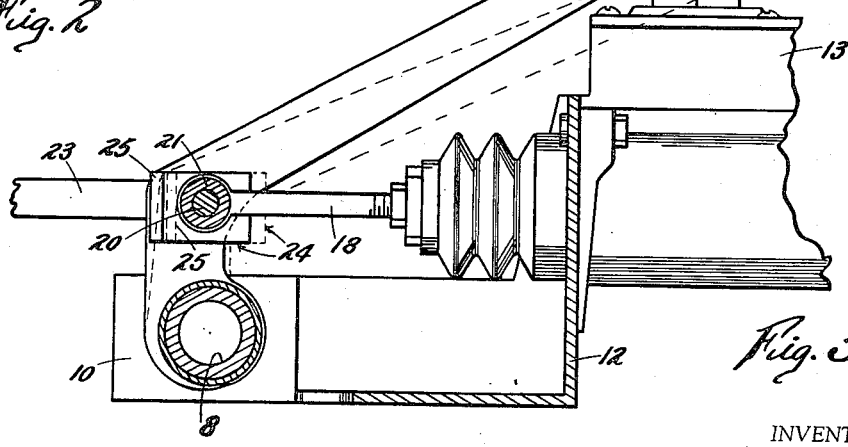
Fig. 3 is an enlarged cross-sectional view taken on line 3—3 of Fig. 1.

The clutch-lever 7 has a pin 22 pivoted thereto which is in substantial alignment with the pin 20 located on the brake lever 6. The pin is adapted to receive a clutch actuating link 23 and also a bracket 24, the latter member having an extension 25 which is positioned in the plane of movement of the brake rod 18 and is located behind the rod and in spaced relationship therefrom, as shown in Fig. 3. The clearance between the free end of the brake rod and the extension 25 on the bracket fastened to the clutch lever functions to allow the clutch lever to be actuated without interfering with the operation of the braking system of the motor vehicle. When the clutch pedal is in its furthermost downward and forward position, the clutch pedal will operate to disengage the vehicle clutch and also operate the braking system.

From the foregoing it will be seen that I have invented a simple and easy means for operating clutch and brake pedals simultaneously when desired.

If in operation the relative operating positions of the clutch lever and the brake lever are such that the bracket 24 will not act to disengage the clutch and brake lever, it is only necessary to regulate the effective motion of the brake lever by means of adjusting the valves 17 on each brake. In this manner my attachment serves as a check for periodical adjustment of the brake system of said vehicle, for when the brake and the clutch will not operate simultaneously, it is notice to the driver of said vehicle that said periodical adjustment is necessary. I have shown my device associated with a fluid pressure or hydraulic brake system; however, I contemplate the use of my attachment on any braking system which employs a brake lever and a clutch lever independently and rockably mounted on a pin and a brake actuating rod movable in a substantially horizontal plane in a vertical plane parallel to the plane of the brake lever motion.

What is claimed is:

1. In a clutch attachment for motor vehicles the combination of a fulcrum pin, a brake lever and a clutch lever independently and rockably mounted on the pin, a brake actuating rod movable in a substantially horizontal plane and in a vertical plane parallel to the vertical plane of the brake lever motion and pivoted to said lever adjacent the clutch lever, a clutch actuating link pivoted to the clutch lever and a bracket mounted on the link pivoting member and adapted to extend behind the rod in spaced relationship therefrom.

2. In a clutch attachment for motor vehicles the combination of a fulcrum pin, a brake lever and a clutch lever independently and rockably mounted in spaced relationship on the pin, pivot members for the levers disposed in substantial alignment above the fulcrum pin, a brake actuating rod movable in a substantially horizontal plane and in a plane parallel to the plane of movement of the brake lever and connected to the pivot member of said lever, a clutch actuating link and a bracket fastened to the pivot member on the clutch lever, said bracket being adapted to extend into the plane of movement of the brake rod and positioned in spaced relationship therefrom.

3. In a clutch attachment for motor vehicles the combination of a fulcrum pin, a brake lever and a clutch lever independently and rockably mounted in spaced relationship on the pin, pivot members for the levers disposed in substantial alignment above the fulcrum pin, an adjustable hydraulic brake system, a master cylinder for the system, a master cylinder actuating rod movable in a substantially horizontal plane and in a vertical plane parallel to the plane of movement of the brake lever and connected to the pivot member of said lever, a clutch actuating link and a bracket fastened to the pivot member on the clutch lever, said bracket being adapted to extend into the plane of movement of the master cylinder actuating rod and positioned in spaced relationship therefrom.

4. In a clutch attachment for motor vehicles the combination of a fulcrum pin, a brake lever and a clutch lever independently mounted in spaced relationship on the pin and rotatable thereon from an inoperative to a forward operative position, an hydraulic brake system, a master cylinder for the system, a master cylinder actuating rod movable in a substantial horizontal plane and in a vertical plane parallel to the plane of movement of the brake lever, a pivot connection between the brake lever and the rod, a bracket mounted on the clutch lever and adapted to extend rearwardly of the rod and into the path of movement of said rod, the bracket being adapted to permit actuation of the clutch lever whilst the brake lever is inoperative and to hold the brake lever in operative position when the clutch is in a forward position.

5. In a clutch lever attachment for motor vehicles the combination of a brake actuating means rotatable from an inoperative to a forward operative position and comprising a brake lever and a brake rod connection therewith, and a bracket fastened to the clutch lever in a position to extend rearwardly and into the plane of movement of the brake rod, said bracket being adapted to permit actuation of the clutch lever whilst the brake lever is inoperative and to hold the brake lever in operative position when the clutch is in a forward position.

6. In a clutch attachment for motor vehicles the combination of a brake lever and a clutch lever, a brake rod fastened to the brake lever and adapted to actuate the brake upon inward movement thereof, and a bracket mounted on the clutch lever to extend into the plane of movement of the rod and disposed behind said rod in spaced relationship therefrom.

7. In a clutch lever attachment for motor vehicles the combination of a brake actuating means rotatable from an inoperative to a forward operative position and comprising a brake lever and a brake rod connection therewith, and a bracket fastened to the clutch lever in a position to extend into the plane of movement of the brake rod and disposed rearwardly of said rod.

8. In a clutch attachment for motor vehicles the combination of a brake lever and a clutch lever, a brake rod fastened to the brake lever and adapted to actuate the brake upon movement thereof, and a bracket mounted on the clutch lever to extend into the plane of movement of the rod and disposed in spaced relationship therefrom.

JOHN E. McGRANE.